US008339875B2

(12) United States Patent
Tuyls et al.

(10) Patent No.: US 8,339,875 B2
(45) Date of Patent: Dec. 25, 2012

(54) METHOD OF REDUCING THE OCCURRENCE OF BURN-IN DUE TO NEGATIVE BIAS TEMPERATURE INSTABILITY

(75) Inventors: Pim T. Tuyls, Eindhoven (NL); Geert J. Schrijen, Eindhoven (NL); Abraham C. Kruseman, Eindhoven (NL)

(73) Assignees: Intrinsic ID B.V., Eindhoven (NL); NXP B.V., Eindhoven (NL)

( * ) Notice: Subject to any disclaimer, the term of this patent is extended or adjusted under 35 U.S.C. 154(b) by 90 days.

(21) Appl. No.: 12/921,901

(22) PCT Filed: Apr. 16, 2009

(86) PCT No.: PCT/IB2009/051592
§ 371 (c)(1),
(2), (4) Date: Jan. 6, 2011

(87) PCT Pub. No.: WO2009/128044
PCT Pub. Date: Oct. 22, 2009

(65) Prior Publication Data
US 2011/0103161 A1    May 5, 2011

(30) Foreign Application Priority Data
Apr. 17, 2008 (EP) ..................... 08154744

(51) Int. Cl.
*G11C 7/22* (2006.01)
(52) U.S. Cl. ............... 365/189.16; 365/189.15
(58) Field of Classification Search ............. 365/189.16, 365/189.15
See application file for complete search history.

(56) References Cited

U.S. PATENT DOCUMENTS

| 5,825,705 | A  | * | 10/1998 | Tsukude et al. ............... 365/222 |
| 5,999,457 | A  | * | 12/1999 | Sato .......................... 365/189.14 |
| 2002/0191447 | A1 | * | 12/2002 | Kondo et al. ............. 365/189.09 |
| 2004/0004872 | A1 | * | 1/2004 | Templeton et al. ........... 365/201 |
| 2007/0165481 | A1 | * | 7/2007 | Norris et al. .................. 365/233 |
| 2010/0080035 | A1 | * | 4/2010 | Venkatraman et al. ....... 365/104 |

FOREIGN PATENT DOCUMENTS

| EP | 1 887 459 | 2/2008 |
| WO | 2006/053304 | 5/2006 |
| WO | 2009/024913 | 2/2009 |

OTHER PUBLICATIONS

International Search Report for PCT/E2009/051592, mailed Jul. 15, 2009.
Kumar et al, "Impact of NBTI on SRAM Read Stability and Design for Reliability," XP009139746, Proceedings of the 7th International Symposium on Quality Electronic Design (ISQED'06), 2006, pp. 1-6.
Holcomb et al "Initial SRAM State as a Fingerprint and Source of True Random Numbers for RFID Tags," XP-002519909, BNS, pp. 1-12.

* cited by examiner

*Primary Examiner* — Tuan T. Nguyen
(74) *Attorney, Agent, or Firm* — Nixon & Vanderhye P.C.

(57) ABSTRACT

A method for alleviating burn-in effect and enabling performing a start-up process in respect of a device comprising a plurality of challengeable memory elements, wherein the memory elements are able to, upon start-up, generate a response pattern of start-up values useful for identification as the response pattern depends on physical characteristics of the memory elements, the method comprising the step of, after start-up of the memory elements, writing a data pattern to the memory elements which is inverse to a response pattern that was previously read from the same memory elements. Thus, degradation of the PMOS transistors due to NBTI can be alleviated.

8 Claims, 3 Drawing Sheets

Figure 1:
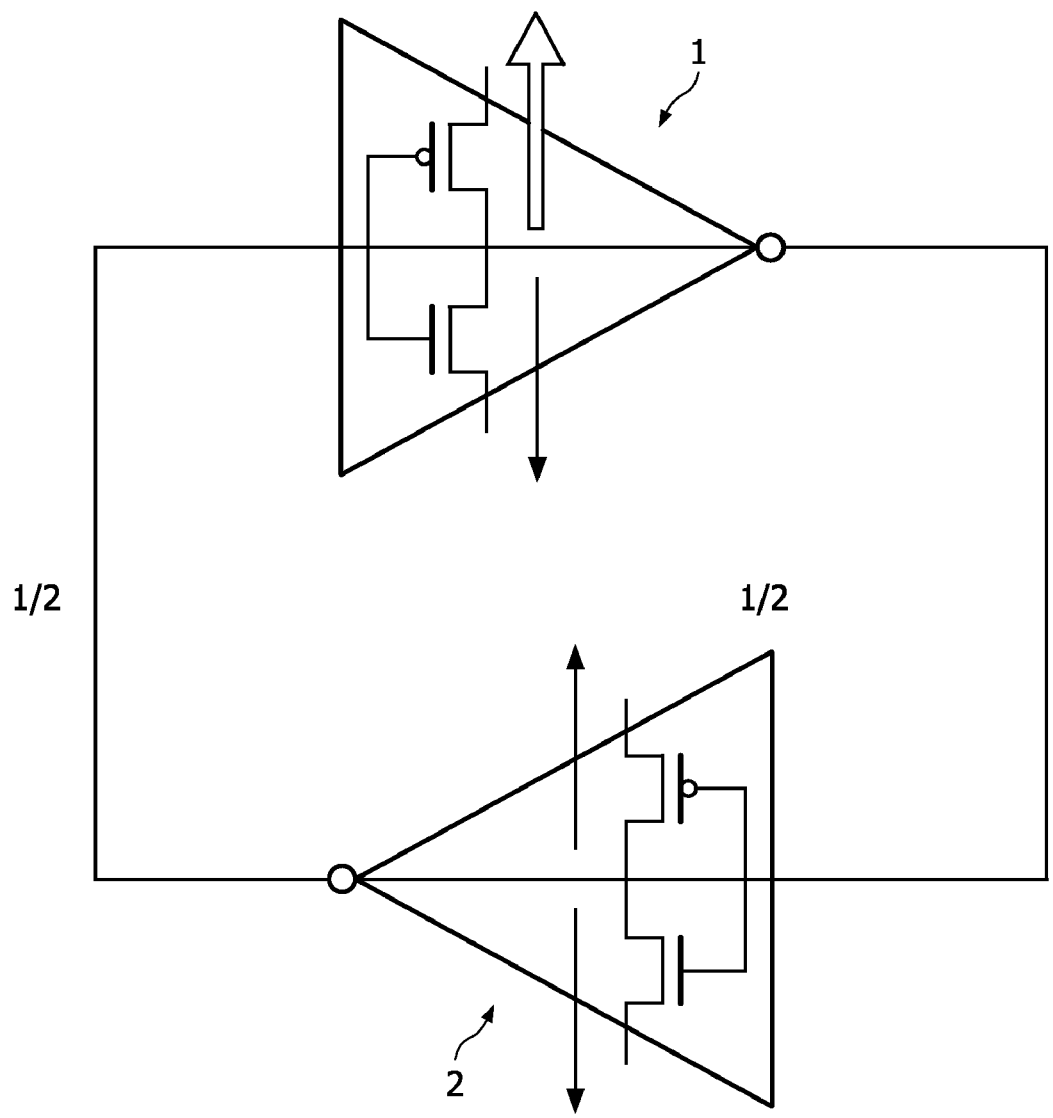

METHOD OF REDUCING THE OCCURRENCE OF BURN-IN DUE TO NEGATIVE BIAS TEMPERATURE INSTABILITY

This application is the U.S. national phase of International Application No. PCT/IB2009/051592, filed 16 Apr. 2009, which designated the U.S. and claims priority to European Application No. 08154744.0, filed 17 Apr. 2008, the entire contents of each of which are hereby incorporated by reference.

This invention relates to a technique for reducing burn-in caused by Negative Bias Temperature Instability (NBTI) in a device, particularly for use in a device which uses a physically unclonable function (PUF) for the purpose of identification thereof or for the purpose of secure key storage based on a PUF.

Field configurable devices, such as Field Programmable Gate Arrays (FPGAs), are widely used for prototyping of electronic designs and algorithms. Furthermore, they are increasingly used as dedicated building blocks in consumer products. Their main advantage compared with ASICs (Application-Specific Integrated Circuits) is their flexibility, as they can be reconfigured in the field. FPGAs are typically configured using data, usually called a configuration bit-stream or simply a bitstream, that is supplied to the device after the device is deployed in an application. A popular type of FPGA is the SRAM-based FPGA. This type of FPGA chip has only volatile memory on board and hence loses its configuration when the power is switched off. On power-up (or 'start-up'), the FPGA is configured by means of a bitstream that is loaded from an external non-volatile memory (e.g. programmable Read-Only memory (PROM), Flash, etc).

Significant revenue is lost due to issues such as cloning of devices based on ICs and/or unreported over-production thereof. As such, it is highly desirable to be able to uniquely identify a particular device and/or prevent configuration thereof with unauthorised configuration data. One known way of uniquely identifying a field programmable device is to use a physically unclonable function (PUF). PUFs are essentially random functions bound to a physical device in such a way that it is computationally infeasible to predict the output of the function without actually evaluating it using the physical device. Since a PUF cannot be copied or modelled, a device equipped with a PUF becomes unclonable (see, for example, 1) P. Tuyls, G. J. Schrijen, B. Skoric, J. van Geloven, N. Verhaegh, R. Walters, 'Read-proof hardware from protective coatings', L. Goubin and M. Matsuit, Editors Proceedings of Cryptographic Hardware and Embedded Systems 2006, volume 4249 of LNCS, pages 369-383, Springer 2006; or 2) J. Guajardo, S. S. Kumar, G. J. Schrijen, P Tuyls, 'FPGA intrinsic PUFs and their use for IP protection', P. Paillier and I. Verbauwhede, Editors Proceedings of Cryptographic Hardware and Embedded Systems Conference (CHES) 2007, volume 4727 of LNCS, pages 63-80, Springer 2007.

One known example of a PUF used to uniquely identify a device is the so-called SRAM PUF, which is based on the fact that, when an SRAM cell is started up it starts up in a random state due to variations in the threshold voltages of the transistors (which, in turn, are due to doping variations). When this is done multiple times, each cell will start up in the same state most of the time.

Actually, the invention can be used for any type of memory element which is based on a feedback loop in which transistors are being used that experience the NBTI, and that are susceptible to production parameters such that they show the described start-up behaviour.

Any memory element showing the described start-up behaviour is called a challengeable memory element, or shortly a memory element, in this application. Examples of such memory cells are SRAM memory cells as mentioned before but also other memory cells based on cross-coupled latches e.g. the butterfly PUF as described in European patent application EP07114732.6 and memory elements like flip-flops.

Referring to FIG. 1 of the drawings, an SRAM cell comprises two cross-coupled inverters 1, 2 with external connections via two further transistors (not shown). Each of the inverters 1, 2 comprises two transistors, one of the transistors being a p-MOS transistor and the other being an n-MOS transistor. As will be well known to a person skilled in the art, in order to bring a p-MOS transistor into the conducting state, the gate-source voltage applied to the transistor must be smaller than the threshold voltage $V_T$ of the transistor. For a p-MOS transistor, therefore, when the voltage applied to the gate is lower than the threshold voltage, the transistor is brought into the conducting state. In contrast, for an n-MOS transistor, when the voltage applied to the gate is lower than the threshold voltage, it acts as a resistor and when the voltage applied to the gate is higher than the threshold voltage, the n-MOS transistor is brought into the conducting state.

The value of the threshold voltage $V_T$ is primarily determined by the amount of doping material present in the transistor and, since this amount of doping material is not constant during production, multiple transistors will have a range of different threshold voltages, even if they were made in the same factory, and even if they were part of the same batch. This implies, therefore, that the gate-source voltage required to be applied to a transistor to bring it into the conducting (or resistor) state will also vary. Therefore, in addition to the fact that the start-up values of a particular set of SRAM cells are likely to be the same each time, the start-up values of different SRAM cells are likely to be different. Thus, the start-up cells response of an arrangement of SRAM cells can be considered to be a PUF.

In practice, however, the main problem that might arise is asymmetrical ageing that mainly affects the p-type MOSFET transistors in an SRAM cell due to a phenomenon known as Negative Bias Temperature Instability (NBTI). NBTI causes the generation of interface traps under negative bias conditions ($V_{gs}=-V_{dd}$) in pMOS transistors, and thereby causes the threshold voltage thereof to decrease. As a result, the preferential start-up behaviour of the affected SRAM cells can change over time and, therefore, adversely affect the reliability of the PUF response of the SRAM cells. This degradation of pMOS devices due to NBTI is known as burn-in.

As said before some other memory elements that are susceptible to aging and have PUF-like properties are the above-mentioned Butterfly PUF and flip-flops and all other memory elements based on cross-coupling flip-flops or latches.

S. V. Kumar, Ch. H. Kim, S. S. Sapatnekar, "Impact on SRAM Read Stability and Design for Reliability", Proceedings of the 7th International Symposium on Quality Electronic Design, pp 210-218, 2006 describes a method for recovering the Static Noise Margin of an SRAM cell by periodically flipping the data contents of the cell. However, this process works on the basis that the cell will be powered on for long periods of time and, if the technique is implemented in software, there is a time overhead which makes it impractical for use with large memory arrays, whereas if the technique is implemented in hardware, there is obviously a significant cost and size overhead. This technique causes both pMOS transistors in one SRAM cell to age more symmetrically, but it is not ideal for preserving the start-up behaviour of SRAM cells.

It is an object of the present invention to provide a method of reducing the impact of Negative Bias Temperature Instability on the start-up behaviour of a memory element used in an integrated circuit for a PUF response.

In accordance with the present invention, there is provided a method as claimed in claim 1.

By means of this method, negative bias applied to the memory elements as a result of the start-up process is reduced before significant temporal degradation of the performance of the p-MOS transistors of the memory elements occurs. By keeping an inverse response pattern in the memory, although there will still be some degradation of the device because a certain negative bias will still be applied to the p-MOS transistors of the memory element, such degradation (or 'ageing') is achieved in such a way as to stabilize the start-up values of the memory elements, effectively improving the start-up behaviour of the memory elements.

In one exemplary embodiment of the present invention, the data pattern may, for each start-up process, be the inverse of a response pattern generated during that respective start-up process.

Preferably, the enrolment response data is encrypted with a key. The key with which the enrolment data is encrypted can be hidden on the device or, in the case of an FPGA, in the FPGA configuration bitstream.

However, in a more preferred embodiment, the data pattern is the inverse of a response pattern obtained during an enrolment phase. It has been determined that using the inverse of a response pattern obtained during an enrolment phase achieves a better anti-aging result than using the inverse of a response pattern of the respective start-up phase. In this case, enrolment phase is preferably performed by the manufacturer at the time of production or at a later time by a trusted third party.

In one preferred application, the device may comprise a Field Programmable Gate Array (FPGA), in which case, the memory elements comprise SRAM memory cells and the data pattern, which is preferably the response pattern determined during the enrolment phase or the helper data from which that response pattern can be reconstructed, is beneficially stored (in a protected way, e.g. encrypted or in the form of helper data) next to the configuration bitstream or program that will run on the chip in an external memory (or patched into the bitstream), which may be a non-volatile memory provided on the same printed circuit board as the FPGA is located.

Also in accordance with the present invention, an electronic device for implementing the method according to claim 1 is provided.

In one exemplary embodiment, the electronic component may comprise an FPGA comprising an array of SRAM cells and the storage means may comprise a non-volatile memory incorporated in or next to the device. Alternatively, however, the component may comprise an ASIC with SRAM memory cells as memory elements and non-volatile memory on board, or a smart card with the same properties.

In a further embodiment of the present invention where the memory is part of an FPGA, there is provided an electronic storage device for an electronic component as defined above, on which is stored a data pattern for application to at least the memory elements in which the first response pattern of start-up values is contained wherein preferably the data pattern is the inverse of a response determined during an enrolment phase.

Further, a computer program product is provided comprising processor-executable instructions which, when loaded and run upon the processor implement the method according to claim 1.

Even further, a computer program product is provided comprising configuration data, preferably in the form of a bit stream, which, when loaded into a configurable electronic circuit, configure the electronic circuit to perform the method according to claim 1.

For the avoidance of doubt, an enrolment phase is any start-up process during which a response in respect of a device is measured and from which a key or 'identifier' is extracted for the first time ("the first time" being interpretable relative, i.e., as the first time within a session of enrolment and authentications). A response pattern is the data read out from the memory elements as a result of the start-up process, whether during the enrolment phase or a verification phase. It is possible to use all of the memory elements in the device to generate the identifier and, subsequently, the response pattern for use during the verification phase. However, because the first response pattern needs to be written back to all of the cells used in this manner, and it is desirable to minimize the amount of elements being used in this manner, it is preferred to use just a sub-set of memory elements for this purpose. It will therefore be appreciated that the identifier for a device can be changed simply by changing the sub-set of chosen memory elements from which the start-up data is read during the enrolment phase and/or more than one identifier can be defined for a device by generating two or more identifiers using two or more respective sub-sets of memory elements.

These and other aspects of the present invention will be apparent from, and elucidated with reference to, the embodiments described herein.

Figure 2:
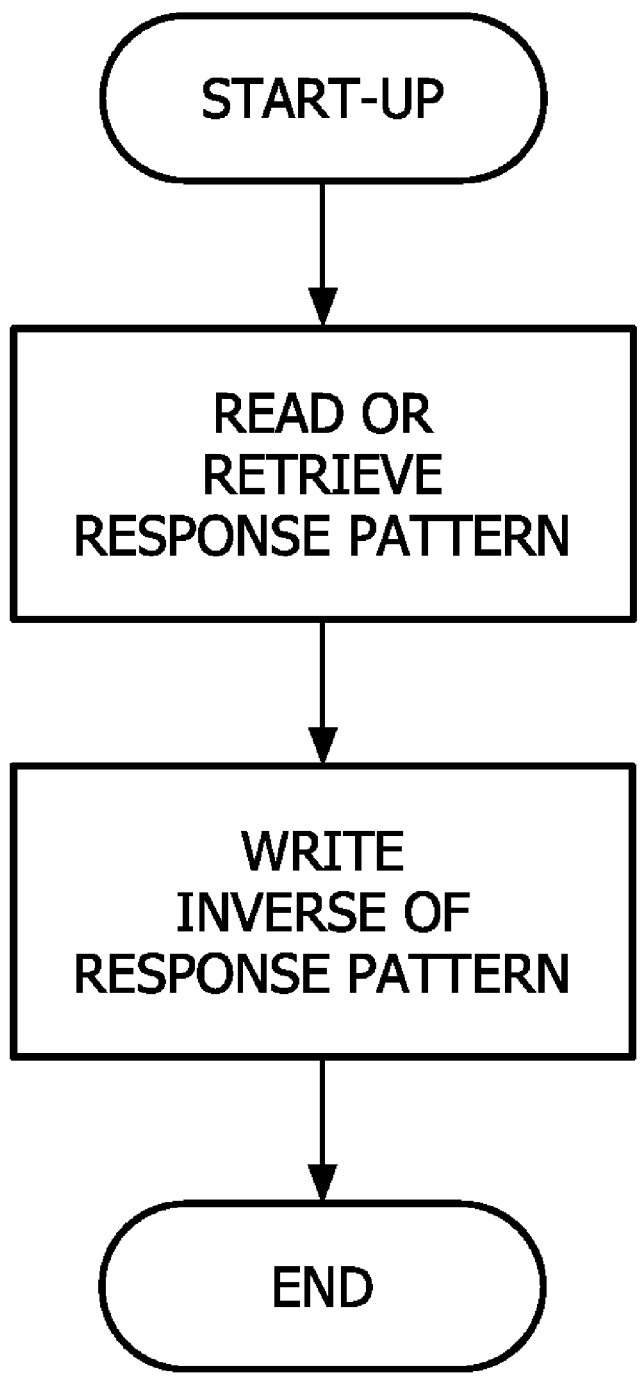
Figure 3:
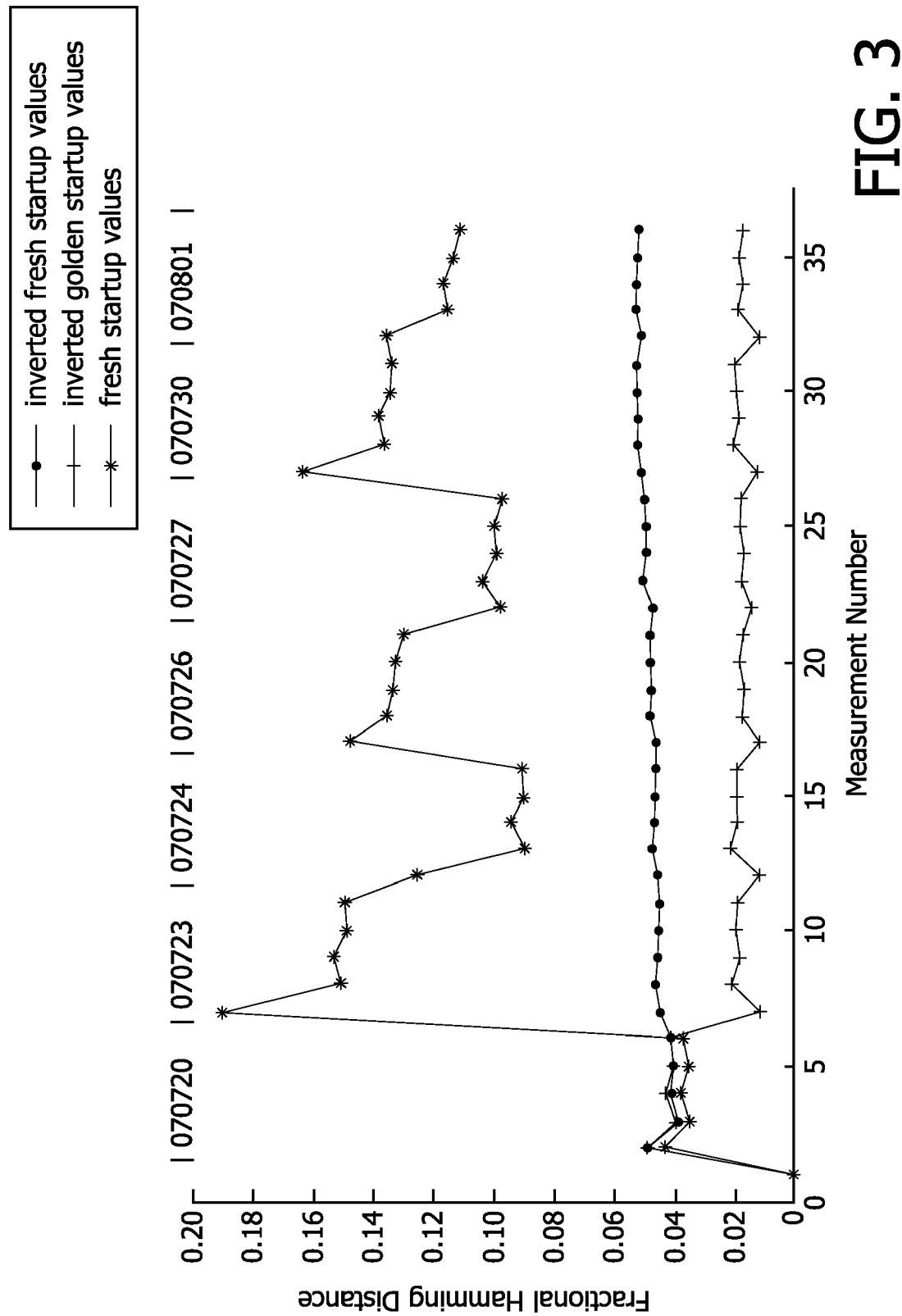

Embodiments of the present invention will now be described by way of examples only and with reference to the accompanying drawings, in which:

FIG. 1 is a schematic partial illustration of an SRAM cell;

FIG. 2 is a schematic flow diagram illustrating the principal steps in a start-up process according to an exemplary embodiment of the present invention; and FIG. 3 illustrates graphically the Hamming distances between start-up values of an enrolment measurement and measurements at later instances of time obtained by experimentation in respect of an exemplary embodiment of the present invention. Three situations are shown: "fresh start-up values" refers to the situation where, after each start-up measurement, the latest start-up values are kept in memory, "inverted fresh start-up values" refers to the situation where, after measuring the start-up values the inverse of these values is written back to the SRAM memory cells, "inverted golden start-up values" refers to the situation where the inverse of the start-up values measured during the enrolment phase are written back after each start-up measurement.

For completeness, and referring back to FIG. 1 of the drawings, an SRAM cell comprises two cross-coupled inverters 1, 2 with external connections via two further transistors (not shown). Each of the inverters 1, 2 comprises two transistors, one of the transistors being a p-MOS transistor and the other being an n-MOS transistor. As will be well known to a person skilled in the art, in order to bring a p-MOS transistor into the conducting state, the gate-source voltage applied to the transistor must be smaller than the threshold voltage $V_T$ of the transistor. For a p-MOS transistor, therefore, when the voltage applied to the gate is lower than the threshold voltage, the transistor is brought into the conducting state. In contrast, for an n-MOS transistor, when the voltage applied to the gate is lower than the threshold voltage, it acts as a resistor and when the voltage applied to the gate is higher than the threshold voltage, the n-MOS transistor is brought into the conducting state.

If the supply voltage over the SRAM is zero, the two pMOS transistors of the SRAM cell are in the conducting state and two nMOS transistors are in the non-conducting state. As the voltage over the SRAM cell starts to increase (at start-up), the voltages over the gates of the two pMOS transistors start to increase accordingly. Assume, for example, that $V_{1T}<V_{2T}$. In this case, the rising voltage over the SRAM cell will first affect pMOS$_1$ and later (as the voltage across the SRAM cell continues to rise) pMOS$_2$. As a result, pMOS$_1$ is first brought into the non-conducting state, such that the output of inverter 1 is low and that of inverter 2 is high and the SRAM cell contains a "0". If, on the other hand, $V_{2T}<V_{1T}$, the SRAM cell would contain a "1" at start-up. Thus, the start-up behaviour of an SRAM cell is dependent on the relationships between the pairs of threshold voltages $V_{1T}$ and $V_{2T}$ of the respective SRAM cells, and these relationships will be substantially randomly distributed across the cell array due to the above-mentioned doping concentrations. It is this fact, coupled with the fact that the response of an array of SRAM cells during a number of start-up events is likely to be the same each time, that has resulted in the use of the response pattern of each SRAM array as a PUF.

In practice, however, the main problem that might arise is asymmetrical ageing that mainly affects the p-type MOSFET transistors in an SRAM cell due to a phenomenon known as Negative Bias Temperature Instability (NBTI). NBTI causes the generation of interface traps under negative bias conditions ($V_{gs}=-V_{dd}$) at elevated temperatures in pMOS transistors, and thereby causes the threshold voltage thereof to decrease. As a result, the preferential start-up behaviour of affected SRAM cells can change over time and, therefore, adversely affect the reliability of the PUF response of the FPGA. This degradation of pMOS devices due to NBTI is known as burn-in.

Consider the situation where the preferential start-up state of an SRAM cell is "1" (i.e., from the example given above, $V_{2T}<V_{1T}$). If the value of the subsequently-written configuration data is also "1", in other words, if the value "1" is kept in the memory for a longer period of time (beyond start-up), there will exist a negative bias (i.e. $V_{1gs}=-V_{dd}$) over the pMOS transistor of inverter 1. As previously explained, NBTI will cause $V_{1T}$ to decrease over time. Thus, at some point, $V_{1T}$ will decrease to the point that $V_{2T}>V_{1T}$. This means that the start-up behaviour of the SRAM cell will have changed from the preferential start-up behaviour such that, when it is started up, it will now contain a "0" instead of a "1". On the other hand, when a '0' is written into the SRAM cell, there will exist a negative bias (i.e. $V_{2gs}=-V_{dd}$) over the pMOS transistor of the inverter 2. Hence, NBTI will, in this case, cause $V_{2T}$ to decrease and the difference between $V_{1T}$ and $V_{2T}$ will further increase, such that the preferential zero start-up state of the SRAM cell will become more pronounced.

In accordance with the present invention, it is proposed to alleviate the impact of NBTI on the preferential start-up state of the SRAM cells by writing the inverse of a response pattern to the array of SRAM cells after the initial response pattern has been measured. A flow diagram illustrating the principal steps of a complete start-up process according to the invention is provided in FIG. 2 of the drawings.

NBTI is a fairly slow mechanism and it has been documented that the amount of degradation in Static Noise Margin (SNM) is noticeable only after a negative bias has been continuously applied for $10^5$ seconds (~1.16 days). Therefore, if the contents of the cells are flipped shortly after start-up (which can be assumed to occur at least once a day), then most, if not all, of the performance of the pMOS transistors can be retained.

In one exemplary embodiment of the present invention, the 'countermeasure' applied to the SRAM cell array after start-up may comprise the inverse of the response pattern determined during that particular start-up process. In this case, the determined response pattern would be written to the non-volatile memory of the FPGA, an inverse function applied thereto and the inverse response pattern thus created subsequently applied as an input to the SRAM array.

However, in an alternative, more preferred embodiment, the 'countermeasure' (i.e. "second response pattern") applied to the SRAM cell array after start-up comprises the inverse of a response pattern determined during the enrolment phase (performed by the manufacturer at the time of production or at a later time by a trusted third party). Not only does this reduce the amount of processing required to be done (because the inverse of the original response pattern can be generated during the enrolment phase and stored on the non-volatile memory of the FPGA throughout its life, rather than having to provide means for achieving the inverse functionality for each start-up process), but the inventors have also determined that this improves the reliability of the PUF, as illustrated graphically in FIG. 3 of the drawings, in which the inverted "golden start-up" values refer to the inverse of the response pattern measured during the enrolment phase, which values are stored in the non-volatile memory of the device during ageing thereof.

It will be appreciated that, while the present invention has been described above specifically in relation to an FPGA, the present invention may equally be applicable to other types of integrated circuits on which verification intrinsic identifiers and secure keys are constructed (e.g. DSPs microcontrollers, ASICs, smart card ICs, etc).

It should also be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method for alleviating burn-in effect and enabling performing a start-up process in respect of a device comprising a plurality of challengeable memory elements, wherein the memory elements are able to, upon start-up, generate a response pattern of start-up values useful for identification as the response pattern depends on physical characteristics of the memory elements, the method comprising the step of, after start-up of the memory elements, writing a data pattern to the memory elements which is inverse to a response pattern that was previously read from the same memory elements.

2. A method according to claim 1, wherein the data pattern being written is, for each start-up process, inverse to the response pattern generated as a result of that respective start-up process.

3. A method according to claim 1, wherein the data pattern being written is fixed and inverse to the response pattern generated during an enrolment phase.

4. A method according to claim 3, wherein the response determined during the enrolment phase is stored in a non-volatile memory, which may be incorporated in the device itself.

5. A method according to claim 3, wherein said response is stored in a protected form.

6. An electronic device being arranged for implementing the method according to claim 1.

7. A computer program product comprising processor-executable instructions which, when loaded and run upon the processor, is arranged to implement the method according to claim 1.

8. A computer program product comprising configuration data, preferably in the form of a bit stream, which, when loaded into a configurable electronic circuit, configure the electronic circuit to be arranged to perform the method according to claim 1.

* * * * *